March 1, 1927.
H. J. SMITH
PENDULUM INCLINATION INDICATOR
Filed Nov. 14, 1925 2 Sheets-Sheet 1
1,619,317
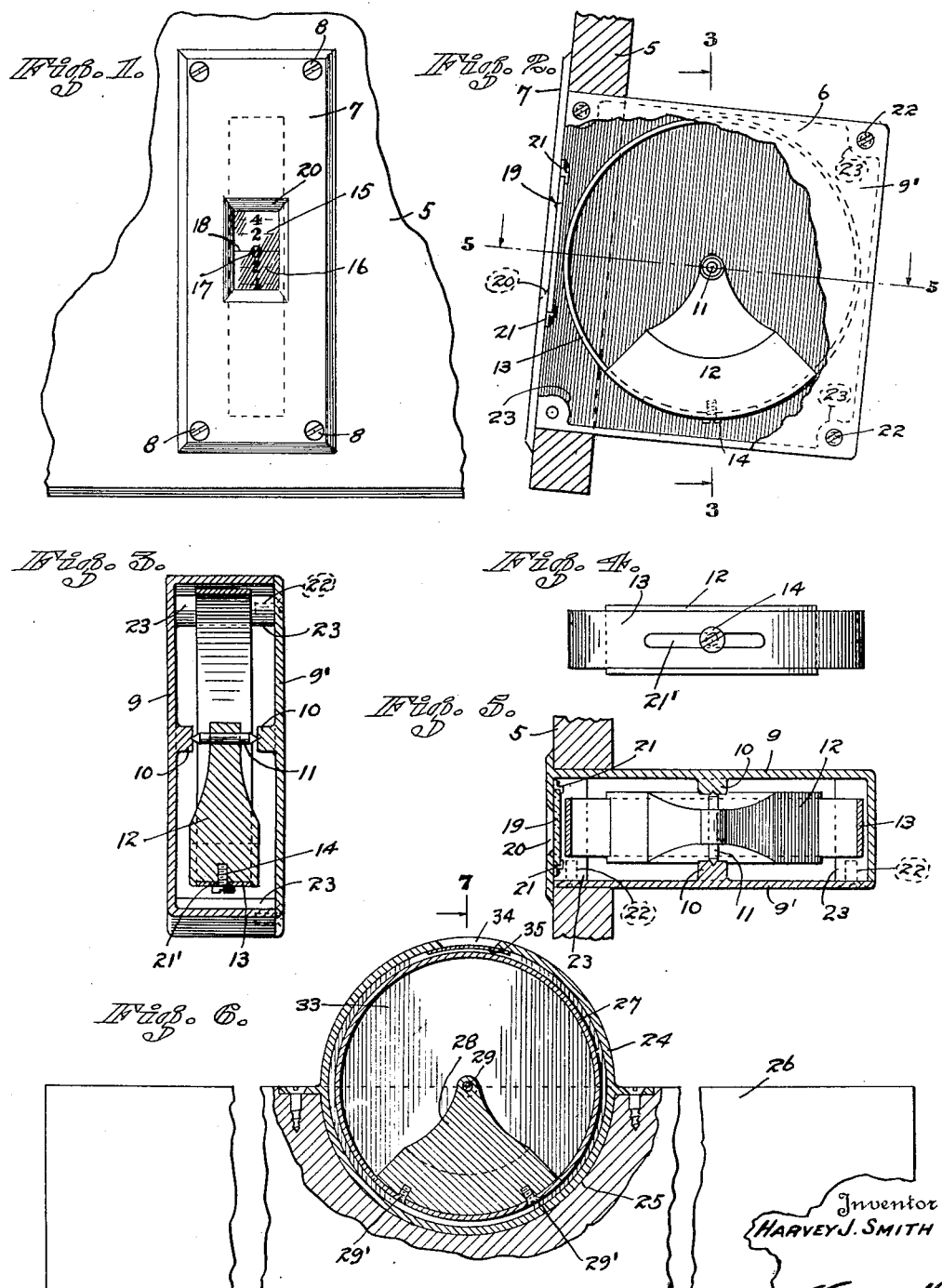
Inventor
HARVEY J. SMITH
Attorneys

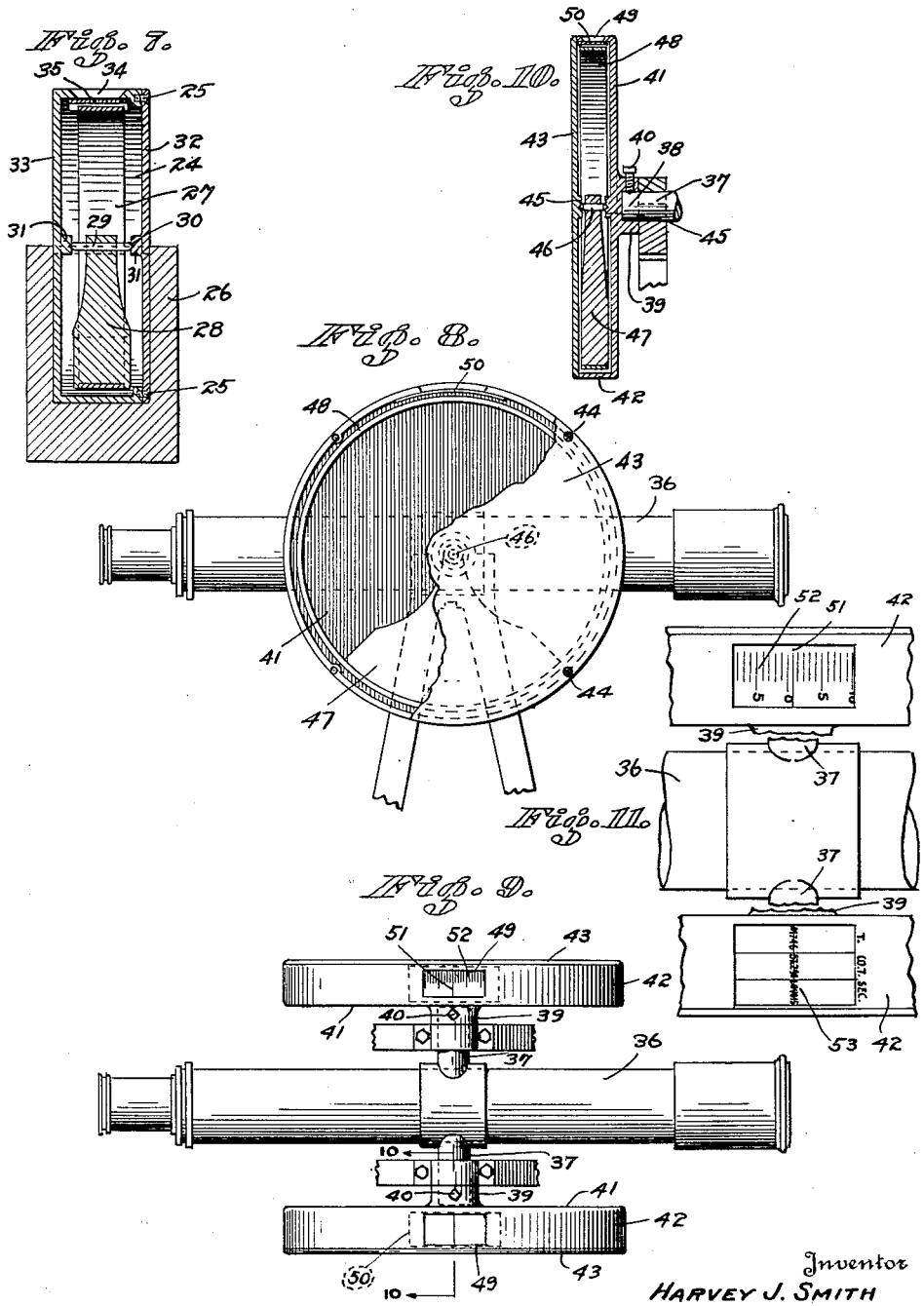

Patented Mar. 1, 1927.

1,619,317

UNITED STATES PATENT OFFICE.

HARVEY J. SMITH, OF BAYPOINT, CALIFORNIA.

PENDULUM INCLINATION INDICATOR.

Application filed November 14, 1925. Serial No. 69,174.

The present invention has for its general object the provision of a device adapted for indicating inclination toward and away from the horizontal, and useable in connection with vehicles to indicate the percent of a grade when a vehicle is ascending a hill or descending therefrom, and further useable as a substitute for a mechanic's spirit-level, and still further useable in connection with a surveyor's transit to indicate the degrees and minutes of an arc, together with mathematical tables used in the solution of trigonometrical problems, such as tables of tangents, secants, and co-tangents.

The above and other objects are accomplished by instrumentalities pointed out in the following specification.

The invention is clearly defined in the claim.

A satisfactory embodiment of the invention is illustrated in the accompanying drawings forming part of the specification and in which—

Figure 1 is a front elevation of a form of my device as used in connection with a motor vehicle to indicate the percentage of a grade in a road over which the vehicle may be passing.

Figure 2 is a view at right angles to Figure 1 with parts thereof broken away to disclose the construction and relation of other parts.

Figure 3 is a vertical cross section on the line 3—3 of Figure 2.

Figure 4 is a detail plan of the indicator mechanism shown in Figures 2 and 3.

Figure 5 is a horizontal cross section on the line 5—5 of Figure 2.

Figure 6 is a vertical section of a modified form of my invention showing the same in use with a mechanic's level.

Figure 7 is a transverse section on line 7—7 of Figure 6.

Figure 8 is a side elevation of a further modified form of my device applied to a surveyor's transit, with parts thereof broken away to disclose the construction and relation of other parts.

Figure 9 is a plan view of the modified form shown in Figure 8.

Figure 10 is a vertical transverse section on the line 10—10 of Figure 9.

Figure 11 is a fragmentary contracted plan taken through the central portions of the telescope and housings of Figure 9 and on a slightly enlarged scale.

In Figures 1 to 5 inclusive, the device is shown as being constructed for attachment to the instrument board 5 of a motor vehicle. In this instance the instrument board is provided with a recess in any convenient portion thereof, and extending through the board 5. This recess is adapted for receiving a hollow rectangular shaped casing 6, one side of which is provided with a marginal flange 7 which bears on the outer face of instrument board 5, and surrounds the recess thereof so as to provide a stop. This flange 7 may be pierced in suitable portions for the reception of fastening means, such as screws 8, which secure the device in place as shown. Casing 6 is quite shallow, and the central portions of its opposite sides 9—9' are provided with bosses 10—10 which provide bearings for the cone-shaped ends of a shaft 11 to which is secured a segmental shaped metal weight 12. The periphery or curved edge of the weight is recessed througout its length for the reception of a circular strip 13 which is fastened to the weight 12 in any suitable manner as by a screw 14. As shown in Figure 3, the strip is flush with the curved edge of the weight, and the diameter of the strip approximates the transverse dimensions of casing 6 so that the casing provides a housing for the strip which is permitted to turn therein, together with the weight upon shaft 11. The periphery of the strip is provided with the markings of opposed scales 15 and 16 which are disposed to either side of a zero point 17. The divisions of the scales 15 and 16 are indicated by numerals as shown. The divisions of the scales are spaced apart for equal distances, and the space between any two successive divisions is such as will enable any division to indicate a gradient of two or a multiple of two percent when such division coincides with a cross line 18 arranged transversely on a transparent panel 19 set behind an opening 20 in the flange 7, and secured in any preferred manner as by brackets 21 upon the inner face of the flange.

It will be obvious that, as viewed in Figure 1, the lower scale 16 will indicate downhill grades while the upper scale 15 will operate to indicate uphill grades. In that the inclination of instrument boards in the driver's compartments of motor vehicles vary, provision must be made in a device of this kind where it is desired to have the flange 7 bear throughout upon the outer face of the board, to permit of adjusting the device to conform to the pitch or slope of the instrument board. In this connection the adjustment is effected by means of the screw 14 which extends through a slot 21' in strip 13. With this construction, it is obvious that the strip 13 may be adjusted so as to aline the zero point 17 with the cross line 18, as may be required by the slope of the instrument board 5.

From the foregoing description, it is obvious that the device shown in Figures 1 to 5 is ideally adapted to function as a gradometer, and is further adapted for use in connection with any of the prevailing types of motor vehicles.

The operation of the device will be largely understood from what has been previously stated, it being obvious that the presence of weight 12 will operate by gravity to turn the strip 13 relatively to the vehicle when the same is ascending or descending. For convenience in assembling the device thus far described, it is preferred to have one of the side walls such as the side wall 9' detachably connected to the casing in any preferred manner, as by screws 22 screwed in bosses 23 in the corner portions of the casing, preferably carried by the side wall 9. In the modified form shown in Figure 6, a circular housing 24 is set into a semi-circular recess 25 arranged in the upper side of an ordinary mechanic's level 26. A circular strip 27 is arranged within casing 24 and free to turn therein and is secured to a segmental shaped weight 28 by screws or other suitable fastening devices 29'. The weight 28 is fixedly secured to a shaft 29 having cone-shaped ends 30 shown in Figure 7 which are rotatably mounted in depressions in bosses 31 on the inner faces of the side plates 32 and 33 of casing 24. Side plate 32 is preferably detachably connected to the casing as by screws 25 to facilitate the assembly of parts, and the outer face of the circular strip 27 is provided with a scale of inches and subdivisions of inches, which scale is visible through an opening 34 in the housing and through a transparent closure 35 set behind the opening and secured to the casing in any preferred manner and provided with a cross line (not shown), similar to the cross line 18 in connection with Figure 1.

From this construction it is obvious that the device is adapted for use as an ordinary mechanic's level for indicating variations from the horizontal or the vertical in the ordinary course of the mechanic's work.

Figures 8 to 11 inclusive show a further modified form of device used in connection with a transit or theodolite, the telescope of which is indicated by 36 and the spindle or horizontal axis by 37. The end portions of the spindle project laterally beyond their bearings, one of such end portions being shown in Figure 10 and indicated by 38. Each of these projecting end portions extends into a socket 39, and a set screw 40 extending through the side wall of the socket operates to key or fixedly secure the socket to rotate with the spindle 37. Each socket is disposed at the central portion of the inner side 41 of a circular casing 42, the outer side wall 43 of which is detachably connected to the peripheral wall of the casing by screws 44. Bearings 45 are centrally disposed on the inner faces of the sides 41 and 43 and receive the cone-shaped ends of a short shaft 46 to which is fixedly secured a segmental metallic weight 47 which carries a circular strip 48 of a size to nicely fit and rotate within the casing. As shown in Figure 9, the sections of the peripheries of the circular strips 48 are visible through sight openings 49 in the casings. Behind these openings are disposed transparent closures 50 having centrally disposed transparent cross lines 51. One of the strips 48 is peripherally provided on either side of a zero point with graduations of two scales which indicate the degrees of opposite arcs of a circle, as indicated by 52. The opposite circular strip in Figure 11 is provided with tables of mathematical data 53, such as tables of tangents, co-tangents and secants for use in the solution of angles obtained by the use of a transit in the ordinary manner. In this way the surveyor has at hand at all times certain information relative to the vertical angles determined by the instrument and as indicated by the degrees of either of the scales on the adjacent strip.

The provision of this construction saves the time that would otherwise be required in referring to the usual trigonometric tables provided in ordinary surveyors' handbooks.

Although I have shown and described one embodiment of my invention, it is to be understood that the same is susceptible of various changes; and I reserve the right to employ such as may come within the scope of the appended claim.

I claim:

A pendulum inclination indicator comprising a casing having oppositely arranged plates provided with centrally disposed bearings, and having side portion connecting said plates and provided with an opening, a sector shaped pendulum, a spindle extending transversely through the vertex portion thereof and journaled in the said bearings, said pendulum being peripherally provided with a groove, and a circular strip surrounding the pendulum and having a portion thereof provided with a slot and seated within the groove and flush with the periphery of the pendulum and a screw extending through the slot and screwed into the pendulum for adjustably connecting the pendulum to the strip.

HARVEY J. SMITH.